United States Patent [19]

Satsuki et al.

[11] 4,438,025

[45] Mar. 20, 1984

[54] DETERGENT COMPOSITIONS

[75] Inventors: Teruhisa Satsuki, Funabashi; Seiiti Ota, Chiba; Setsuko Tabata, Tachikawa, all of Japan

[73] Assignee: Lion Corporation, Tokyo, Japan

[21] Appl. No.: 453,691

[22] Filed: Dec. 27, 1982

[30] Foreign Application Priority Data

Dec. 30, 1981 [JP] Japan ................. 56-210654

[51] Int. Cl.$^3$ .............. C11D 1/28; C11D 1/665; C11D 1/52

[52] U.S. Cl. .................... 252/545; 252/541; 252/548; 252/557

[58] Field of Search ............. 252/117, 121, 538, 557, 252/523, 526, 541, 545

[56] References Cited

U.S. PATENT DOCUMENTS

| | | | |
|---|---|---|---|
| 2,607,740 | 8/1952 | Vitale | 252/557 |
| 3,219,584 | 11/1965 | Stirton | 252/109 |
| 3,274,117 | 9/1966 | Stein | 252/557 |
| 3,338,838 | 8/1967 | Wilson | 252/557 |
| 3,632,517 | 1/1972 | Stirton | 252/109 |
| 3,915,881 | 10/1975 | Davies | 252/557 |

FOREIGN PATENT DOCUMENTS 52-117908 10/1977 Japan .
53-26805 3/1978 Japan .
53-41310 4/1978 Japan .

*Primary Examiner*—Dennis L. Albrecht
*Attorney, Agent, or Firm*—Brisebois & Kruger

[57] ABSTRACT

The invention provides a novel detergent composition free from the problem of waterspots left on the surface of a glassware washed therewith followed by rinse in addition to the excellent detergency and foaming power. The composition comprises, as the essential components thereof, from 15 to 50 parts by weight of a neutral salt of an α-sulfonated fatty acid having 14 to 18 carbon atoms in a molecule, the countercations being magnesium or a substituted or unsubstituted ammonium ion, such as those derived from mono-, di- and triethanolamines, and from 85 to 50 parts by weight of a diethanolamide of a fatty acid having about 12 carbon atoms in a molecule, such as lauric acid or coconut oil fatty acid. The performance of the inventive detergent composition can further be improved by replacing up to 80% by weight of the above neutral salt with a salt of an alkyl, e.g. methyl, ester of an α-sulfonated fatty acid having 14 to 18 carbon atoms in a molecule, the countercation for the sulfo group being magnesium or a substituted or unsubstituted ammonium ion similar to those in the neutral salt.

6 Claims, No Drawings

DETERGENT COMPOSITIONS

BACKGROUND OF THE INVENTION

The present invention relates to a detergent composition or, more particularly, to a detergent composition which, in addition to the excellent detergency and foaming power, is free from scums so that no waterspots are left on the surface of a glassware washed therewith followed by rinse. The detergent composition of the invention comprises a neutral salt of an α-sulfonated fatty acid, a higher fatty acid diethanolamide and, optionally, a salt of an α-sulfonated fatty acid ester as the essential ingredients.

There have been proposed in the prior art several detergent compositions comprising a neutral salt of an α-sulfonated fatty acid as a component. The use of such a neutral salt of an α-sulfonated fatty acid is not promising and limited to the use as a partial substitute for a builder or a salt of α-sulfonated fatty acid esters (see, for example, Japanese Patent Kokai No. 47-6276, 47-12582 and 50-38708) because of the low detergency and foaming power in addition to the problems that the disodium or dipotassium salts of α-sulfonated fatty acids are hardly soluble in water and that the di(triethanolamine) salts thereof having a relatively high solubility in water may sometimes form scums when used in hard water so that waterspots are left on the surface of a glassware washed therewith.

As a remedy for the above mentioned defective points of the neutral salts of α-sulfonated fatty acids, there have been proposed several salts of α-sulfonated fatty acids obtained by the esterification of the carboxyl groups in the α-sulfonated fatty acid with a lower alcohol as a component of detergent compositions and they are widely used in combination with a non-ionic surface active agent or soap (see Japanese Patent Kokai No. 50-38708), with a polyethylene glycol (see Japanese Patent Kokai No. 52-117908) and with a fatty acid diethanolamide (see Japanese Patent Kokai Nos. 53-41310 and 53-26805). These detergent compositions are, however, not satisfactory due to the still insufficient detergency and foaming power.

Accordingly, there has been eagerly desired to develop a detergent composition which is, in addition to satisfactorily high detergency and foaming power, free from the problem of scum formation even when used with hard water so that no water-spots are left on the surface of a glassware washed therewith.

SUMMARY OF THE INVENTION

An object of the present invention is therefore to provide a novel and improved detergent composition which is, in addition to excellent detergency and foaming power, free from the problem of scum formation even when used with hard water so that no waterspots are left on the surface of a glassware washed and cleaned therewith.

The above mentioned object of the invention is achieved on the base of a discovery by the inventors that a combination of a specific neutral salt of an α-sulfonated fatty acid and a diethanolamide of a higher fatty acid, e.g. lauric acid or coconut oil fatty acid, can overcome the defects in the single use of a conventional neutral salt of an α-sulfonated fatty acid and the effectiveness of the above combination is further increased by the partial substitution of a salt of an α-sulfonated fatty acid ester for the neutral salt.

Thus, the detergent composition of the present invention comprises from 15 to 50 parts by weight of a component (a) composed of (a-1) at least 20% by weight of a water-soluble neutral salt of an α-sulfonated fatty acid represented by the general formula

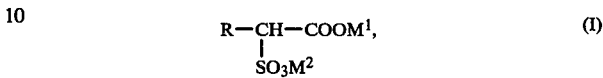

in which R is an alkyl group having from 12 to 16 carbon atoms and $M^1$ and $M^2$ are each independently from the other a cation selected from the class consisting of magnesium ion $\frac{1}{2}Mg^{++}$ and substituted or unsubstituted ammonium ions, and (a-2) up to 80% by weight of a water-soluble salt of an α-sulfonated fatty acid ester represented by the general formula

in which R has the same meaning as defined above, $R^1$ is an alkyl group having from 1 to 3 carbon atoms and $M^3$ is a cation as defined above for the symbols $M^1$ and $M^2$ but independent therefrom, and from 85 to 50 parts by weight of a component (b) which is a diethanolamide of a higher fatty acid having from about 11 to about 15 carbon atoms on an average in a molecule.

The performance of the above described inventive detergent composition is particularly satisfactory when the weight proportion of the components (a-1) to (a-2) is in the range from 50:50 to 20:80.

DETAILED DESCRIPTION OF THE PREFERRED EMBODIMENTS

In the following, description is given for each of the components (a-1), (a-2) and (b) which the inventive detergent composition comprises.

In the first place, the component (a-1) which is essential in the inventive detergent composition is a neutral salt of an α-sulfonated fatty acid represented by the above given general formula (I). In the formula, the group denoted by R is an alkyl group having from 12 to 16 carbon atoms such as dodecyl, tetradecyl and hexadecyl groups. $M^1$ and $M^2$ in the formula are each independently from the other a cation selected from the class consisting of magnesium ion $\frac{1}{2}Mg^{++}$ and substituted or unsubstituted ammonium ions. Preferable examples of the substituted ammonium ions are those derived from monoethanolamine, diethanolamine and triethanolamine; i.e. mono-, di- and tri(hydroxyethyl) ammonium ions.

Exemplary of such neutral salts are magnesium salts, di(ammonium) salts, di(monoethanolamine) salts, di(triethanolamine) salts and half-magnesium triethanolamine salts of α-sulfonated myristic acid, α-sulfonated palmitic acid, α-sulfonated stearic acid and the like. These salts are soluble in water.

These neutral salts of α-sulfonated fatty acids can be prepared, for example, by the method in which a fatty acid having from 14 to 18 carbon atoms in a molecule is first sulfonated with sulfuric anhydride to introduce a sulfo group at the α-position relative to the carboxyl followed by the neutralization of the acid groups with a basic magnesium compound or a substituted or unsubstituted ammonium compound.

It is essential that the alkyl group denoted by R should have from 12 to 16 carbon atoms since a similar neutral salt of which the number of carbon atoms in the alkyl group is smaller than 12 or larger than 16 cannot give a detergent composition exhibiting satisfactory performance even when used in combination with the other component or components according to the invention.

The other essential component in the inventive detergent composition is the component (b) which is a diethanolamide of a higher fatty acid having about 11 to about 15 carbon atoms in a molecule on an average. When the component (b) is a mixture of the diethanolamides of several different higher fatty acids, it is preferable that at least 50% by weight of the mixture is composed of the diethanolamides of fatty acids having 12 to 14 carbon atoms in a molecule. Such a diethanolamide or a mixture of diethanolamides is readily obtained by the reaction of lauric acid or coconut oil fatty acid, i.e. the fatty acid obtained by the saponification of coconut oil as the glyceride of the acid, with diethanolamine and includes lauroyl diethanolamide and coconyl diethanolamide. Several commercially available products of such a diethanolamide may be used as such as exemplified by Amizol LDE and Amizol CDE sold by Kawaken Fine Chemical Co. and Marbon ML and Marbon MM sold by Matsumoto Yushi Co., both in Japan.

Since the above mentioned component (a-2) is not essential in the inventive detergent composition, the inventive composition essentially contains the neutral salt of an α-sulfonated fatty acid as the component (a-1) and the diethanolamide of a higher fatty acid as the component (b) as described above. When the detergent composition does not contain the component (a-2), the weight ratio of the components (a-1) to (b) should be in the range from 15:85 to 50:50 since a detergent composition formulated in a proportion outside the above range cannot exhibit satisfactorily high detergency and foaming power. In particular, the amount of the component (b) should be at least 50% by weight of the total amount of the components (a-1) and (b) in order to completely prevent formation of scums and hence waterspots which may be left on the surface of a glassware washed by use of such a detergent composition deficient of the component (b).

It should be noted that the effectiveness of the diethanolamide of a higher fatty acid as defined above is very specific for the object of the invention and no satisfactory results can be obtained in respect of the detergency by use of other fatty acid alkanolamides of the similar structure such as stearyl diethanolamide, oleyl diethanolamide, cocoyl monoethanolamide and the like used in combination with the neutral salt of an α-sulfonated fatty acid.

As is mentioned before, the inventive detergent composition can be imparted with further improved detergency and foaming power by the partial substitution of a salt of an α-sulfonated fatty acid ester represented by the above given general formula (II) as the component (a-2) for up to 80% by weight or, preferably, from 50 to 80% by weight of the neutral salt as the component (a-1) to make a binary component (a).

In the general formula (II), the symbol R has the same meaning as defined in the general formula (I) for the component (a-1) and denotes an alkyl group having from 12 to 16 carbon atoms such as dodecyl, tetradecyl and hexadecyl groups. The symbol $R^1$ denotes an alkyl group having from 1 to 3 carbon atoms such as methyl, ethyl and propyl groups and the symbol $M^3$ denotes the same cation as the cations denoted by $M^1$ and $M^2$. The cation $M^3$ may be the same as or different from those denoted by $M^1$ and $M^2$ in the component (a-1).

Exemplary of such a component (a-2) are the magnesium salt, ammonium salt, monoethanolamine salt and diethanolamine salt of methyl, ethyl and propyl esters of α-sulfonated myristic acid, α-sulfonated palmitic acid, α-sulfonated stearic acid and the like.

The salt of an α-sulfonated fatty acid ester as mentioned above can be prepared, for example, by the method in which a fatty acid having from 14 to 18 carbon atoms in a molecule is first esterified with an aliphatic alcohol having from 1 to 3 carbon atoms in a molecule and then sulfonated with sulfuric anhydride to introduce a sulfo group at the α-position followed by the neutralization of the sulfo group with a basic magnesium compound or a substituted or unsubstituted ammonium compound or by the method in which the order of the above mentioned esterification and sulfonation is reversed to first sulfonate the fatty acid and then to esterify the α-sulfonated fatty acid followed by the neutralization in the same manner as above.

It was quite unexpected that the detergency and foaming power of the detergent composition could be markedly improved when the component (a) to be combined with the component (b) is a binary mixture of 20 to 50% by weight of the neutral salt and 80 to 50% by weight of the salt of an α-sulfonated fatty acid ester as defined above. No sufficient improvements can be obtained when the weight ratio of these two components (a-1) and (a-2) is outside this range.

It should be noted that the weight ratio of the component (a), which is a binary mixture of the components (a-1) and (a-2), to the component (b) should be the same as in the omission of the component (a-2). That is, the inventive detergent composition should comprise from 15 to 50 parts by weight of the component (a), i.e. component (a-1) plus component (a-2), and from 85 to 50 parts by weight of the component (b).

As is understood from the above description, the most characteristic component in the inventive detergent composition is the neutral salt of an α-sulfonated fatty acid, which has been rarely used as a component of detergent compositions in the prior art. The possibility of the use of such a neutral salt is obtained by the suitable selection of the countercations and by the combination thereof with the specific diethanolamide, preferably, with further admixture of the salt of an α-sulfonated fatty acid ester. The inventive detergent compositions formulated with these components in the weight proportions as described above have advantages in their excellent detergency and foaming power as well as due to the absence of waterspots on the surface of a glassware washed by use thereof as a result of the almost complete prevention of formation of scums even when the detergent composition is used in hard water.

Following are the examples to illustrate the formulation and performance of the inventive detergent compositions in further detail. In the examples, the performance of each of the inventive and comparative detergent compositions was evaluated in three respects of the detergency, foaming power and number of waterspots left on the surface of a glassware washed therewith in the following manners.

Detergency: an oily soil solution was prepared by dissolving each 10 g of a pharmacopoeial soybean oil and a pharmacopoeial beef tallow in 60 ml of chloroform followed by admixture of 0.1 g of Oil Red. Glass plates of each 25 mm×75 mm were coated with this solution on both surfaces by dipping therein followed by pulling up and air-drying at 25° C. for at least 30 minutes to evaporate the solvent. The amount of the oily soil taken up on each of the glass plates was 20 to 23 mg. Six of the thus soiled glass plates were dipped in 700 ml of a detergent solution under test at 25° C. for 3 minutes with agitation at 250 r.p.m. followed by air-drying.

The detergency of the detergent composition was expressed by the percentage of the oily soil removed from the glass plate in the above washing procedure as an average calculated with the following equation for the six plates.

$$\text{Detergency, \%} = \left(1 - \frac{W_2 - W_0}{W_1 - W_0}\right) \times 100,$$

in which $W_0$ is the weight of the unsoiled glass plate, $W_1$ is the weight of the glass plate soiled with the solution after drying and $W_2$ is the weight of the glass plate after washing and drying.

Foaming power: a detergent solution of 3 liter volume at 25° C. contained in vat of 30 cm diameter and 12 cm depth was foamed by 10 times repetition of compression and expansion of a sponge therein and then five dishes of 200 mm diameter each coated with 0.5 g of butter and dipped in the detergent solution were rubbed with the sponge one by one 10 times on the top surface and 5 times on the bottom surface. The foaming power of the detergent composition was given by the height of the foam layer in mm measured immediately after the above washing of the fifth dish. When this height was smaller than 5 mm, the detergent composition was evaluated as practically unsatisfactory and marked with NG in the following tables summarizing the results of the tests regardless of the satisfactory results in other respects.

Waterspots: a glass cup of 60 mm diameter and 100 mm height was washed by use of a sponge in 3 liters of a detergent solution of 5° DH at 25° C. followed by twice repeated rinse each time in 3 liters of rinse water of 5° DH at 25° C. and air-drying. The number of the waterspots, i.e. the white spots left on the surface of the thus dried glass cup was counted visually. When the number of the waterspots is 10 or smaller or larger than 10 in the above test, the detergent composition was evaluated to be practically satisfactory or unsatisfactory and marked with G or NG, respectively, in the tables summarizing the results of the tests in the examples. The tables also include the overall evaluation of the compositions as a commercial product expressed by E, G and NG for the excellent, satisfactory and unsatisfactory ones, respectively.

EXAMPLE 1

(Experiments No. 1 to No. 16)

Detergent compositions were prepared each containing 50% by weight, the balance being water, of the effective ingredients composed of a neutral salt of an α-sulfonated hardened beef tallow fatty acid A-I to A-VI below as the component (a-1) and coconut oil fatty acid diethanolamide as the component (b) (referred to as B-I hereinafter) each in the % content indicated in Table 1 below. The performance of each of these detergent compositions was evaluated with an aqueous detergent solution containing 0.15% of the detergent composition in the testing procedures described above. The results of the tests are shown in Table 1. Experiments No. 9 to No. 16 were for comparative purpose.

A-I: di(triethanolamine) salt of the acid
A-II: half-magnesium mono(triethanolamine) salt of the acid
A-III: diammonium salt of the acid
A-IV: magnesium salt of the acid
A:V: disodium salt of the acid
A-VI: dipotassium salt of the acid

EXAMPLE 2

(Experiments No. 17 to No. 30)

Similarly to the experiments in Example 1 above, several detergent compositions were prepared by replacing the neutral salts A-I to A-VI as the component (a-1) each with one of the half-magnesium mono(triethanolamine) salts of an α-sulfonated fatty acid of which the alkyl group denoted by the symbol R in the general formula (I) had 10, 12, 14 or 16 carbon atoms. These neutral salts are referred to as A-VII, A-VIII, A-IX and A-X, respectively, hereinbelow. The alkanolamide was the same as B-I used in Example 1. The formulations and results of the tests are summarized in Table 1. Experiments No. 24 to No. 30 were for comparative purpose.

TABLE 1

| Experiment No. | Component (a-1) (% by weight) | Component (b), B-I, % by weight | Detergency, % | Foaming power, mm | Waterspots | Overall evaluation |
|---|---|---|---|---|---|---|
| 1 | A-I (25) | 25 | 57 | 7 | G | G |
| 2 | A-I (12.5) | 37.5 | 78 | 10 | G | G |
| 3 | A-I (10) | 40 | 52 | 10 | G | G |
| 4 | A-II (25) | 25 | 42 | 8 | G | G |
| 5 | A-II (12.5) | 37.5 | 70 | 9 | G | G |
| 6 | A-II (10) | 40 | 67 | 9 | G | G |
| 7 | A-III (12.5) | 37.5 | 71 | 8 | G | G |
| 8 | A-IV (12.5) | 37.5 | 42 | 7 | G | G |
| 9 | A-I (50) | 0 | 2 | 1 | NG | NG |
| 10 | A-I (37.5) | 12.5 | 7 | 1 | NG | NG |
| 11 | A-I (5) | 45 | 32 | 3 | G | NG |
| 12 | A-II (50) | 0 | 2 | 1 | NG | NG |
| 13 | A-II (37.5) | 12.5 | 6 | 1 | NG | NG |
| 14 | A-III (5) | 45 | 31 | 4 | G | NG |
| 15 | A-V (12.5) | 37.5 | 0 | 0 | NG | NG |
| 16 | A-VI (12.5) | 37.5 | 0 | 0 | NG | NG |
| 17 | A-X (25) | 25 | 70 | 9 | G | G |
| 18 | A-X (10) | 40 | 66 | 8 | G | G |
| 19 | A-IX (25) | 25 | 38 | 9 | G | G |
| 20 | A-IX (12.5) | 37.5 | 70 | 10 | G | G |
| 21 | A-IX (10) | 40 | 65 | 8 | G | G |
| 22 | A-VIII (25) | 25 | 31 | 6 | G | G |
| 23 | A-VIII (10) | 40 | 32 | 6 | G | G |
| 24 | A-X (5) | 45 | 27 | 2 | G | NG |
| 25 | A-IX (50) | 0 | 2 | 0 | NG | NG |
| 26 | A-IX (37.5) | 12.5 | 3 | 1 | NG | NG |
| 27 | A-IX (5) | 45 | 29 | 4 | G | NG |
| 28 | A-VIII (37.5) | 12.5 | 8 | 1 | NG | NG |
| 29 | A-VII (25) | 25 | 0 | 0 | G | NG |
| 30 | A-VII (12.5) | 37.5 | 0 | 0 | G | NG |

EXAMPLE 3

(Experiments No. 31 to No. 34)

The experimental procedure was substantially the same as in Experiment No. 1 of Example 1 except that the diethanolamide of coconut oil fatty acid (B-I) as the component (b) was replaced with either one of different alkanolamides: lauroyl diethanolamide (B-II), stearoyl diethanolamide (B-III), monoethanolamide of coconut oil fatty acid (B-IV) and oleoyl diethanolamide (B-V) in Experiments No. 31 to No. 34, respectively. Experiments No. 32 to No. 34 were for comparative purpose. Table 2 below summarizes the results of the tests with these detergent compositions including the composition in Experiment No. 1 to facilitate comparison between the inventive and comparative compositions:

TABLE 2

| Experiment No. | Component (b) | Detergency, % | Foaming power, mm | Water-spots | Overall evaluation |
|---|---|---|---|---|---|
| 1 | B-I | 57 | 7 | G | G |
| 31 | B-II | 85 | 12 | G | G |
| 32 | B-III | 6 | 0 | NG | NG |
| 33 | B-IV | 7 | 3 | NG | NG |
| 34 | B-V | 7 | 0 | G | NG |

EXAMPLE 4

(Experiments No. 35 to No. 38)

Experimental procedure was substantially the same as in Experiment No. 1 of Example 1 except that the di(triethanolamine) salt of the α-sulfonated hardened beef tallow fatty acid A-I as the component (a-1) was partly or wholly replaced with a mono(triethanolamine) salt of the methyl ester of the α-sulfonated hardened beef tallow fatty acid as the component (a-2) in varied proportions. Experiment No. 38 was for comparative purpose. Table 3 below summarizes the formulation, i.e. the % contents of the components (a-1) and (a-2), and the results of the tests including Experiment No. 1 to facilitate understanding of the effectiveness of the combined use of the components (a-1) and (a-2).

TABLE 3

| Experiment No. | Component (a-1), % by weight | Component (a-2), % by weight | Detergency, % | Foaming power, mm | Water-spots | Overall evaluation |
|---|---|---|---|---|---|---|
| 1 | 25 | 0 | 57 | 7 | G | G |
| 35 | 20 | 5 | 62 | 8 | G | G |
| 36 | 12.5 | 12.5 | 72 | 13 | G | E |
| 37 | 5 | 20 | 75 | 12 | G | E |
| 38 | 0 | 25 | 45 | 3 | G | NG |

What is claimed is:

1. A detergent composition suitable for washing glassware without leaving water spots, and having excellent detergency and foaming characteristics, said composition consisting essentially of:
   from 15 to 50 parts by weight of a component (a) composed of
   (a-1) at least 20% by weight of a water-soluble neutral salt of an α-sulfonated fatty acid represented by the general formula

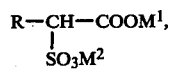

in which R is an alkyl group having from 12 to 16 carbon atoms and $M^1$ and $M^2$ are each independently from the other a cation selected from the class consisting of magnesium ion $\frac{1}{2}Mg^{++}$ and substituted or unsubstituted ammonium ions, and
   (a-2) up to 80% by weight of a water-soluble salt of an α-sulfonated fatty acid ester represented by the general formula

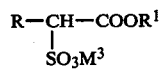

in which R has the same meaning as defined above, $R^1$ is an alkyl group having from 1 to 3 carbon atoms and $M^3$ is a cation independently selected from the same class as defined for the symbols $M^1$ and $M^2$ above, and
   from 85 to 50 parts by weight of a component (b) which is a diethanolamide of a higher fatty acid, said fatty acid having about 11 to about 15 carbon atoms on an average in a molecule.

2. The detergent composition as claimed in claim 1 wherein the component (a) is a binary mixture of the components (a-1) and (a-2) in a weight ratio in the range from 50:50 to 20:80.

3. The detergent composition as claimed in claim 1 wherein the group denoted by R is a dodecyl, tetradecyl or hexadecyl group.

4. The detergent composition as claimed in claim 1 wherein the substituted ammonium ion denoted by $M^1$ or $M^2$ is an ammonium cation derived from monoethanolamine, diethanolamine or triethanolamine.

5. The detergent composition as claimed in claim 1 wherein the component (b) is lauroyl diethanolamide or a diethanolamide of coconut oil fatty acid.

6. The detergent composition as claimed in claim 1 wherein the alkyl group denoted by $R^1$ is a methyl group.

* * * * *